United States Patent [19]

Liang

[11] Patent Number: 6,065,336

[45] Date of Patent: May 23, 2000

[54] OIL LEVEL DETECTOR MOUNTING ARRANGEMENT

[76] Inventor: Chung-Ho Liang, 2/F., No. 66, Sec. 3, Cheng-Tai Rd., Wu-Ku Village, Taipei County, Taiwan

[21] Appl. No.: 09/342,197

[22] Filed: Jun. 29, 1999

[51] Int. Cl.[7] .................................................. G01F 23/68
[52] U.S. Cl. .......................... 73/305; 73/304 R; 73/306; 73/313; 267/137; 267/80
[58] Field of Search .............................. 73/305, 306, 304, 73/313, 319, DIG. 5; 267/137, 80

[56] References Cited

U.S. PATENT DOCUMENTS 4,637,254   1/1987   Dyben et al. ........................ 73/304 R Primary Examiner—Hezron Williams
Assistant Examiner—Dennis Loo
Attorney, Agent, or Firm—Rosenberg, Klein & Lee

[57] ABSTRACT

An oil level detector mounting arrangement, which includes a mount having a downward tube dipped in the oil in the oil tank of a vehicle, a float floating in the oil in the oil tank and moved along the downward tube, and a circuit board sealed in the downward tube and carrying a plurality of solenoids at different elevations for acting with magnets at the float to indicate the elevation of the float in the oil tank, wherein the solenoids each have a first end inserted through a respective hole at the circuit board and then welded to a contact at the circuit board, and a second end inserted through a respective hole at the circuit board and then welded to a common springy wire conductor suspended from the circuit board.

2 Claims, 5 Drawing Sheets

OIL LEVEL DETECTOR MOUNTING ARRANGEMENT

BACKGROUND OF THE INVENTION

The present invention relates to an oil level detector mounting arrangement, and more particularly to such an oil level detector mounting arrangement which provides a shock preventing arrangement to protect solenoids.

Figures from 4 through 6 show a prior art oil level detector mounting arrangement for detecting the oil level in the oil tank of a vehicle. This oil level detector mounting arrangement comprises a mount 6 fixedly fastened to the inside of the oil tank of a vehicle, the mount comprising a center hole 62, and a downward tube 61 having an open top end formed integral with the mount around the center hole 62 and a closed bottom end dipped into the oil in the oil tank of the vehicle; a float 63 floating in the oil in the oil tank of the vehicle and moved vertically along the downward tube 61, the float carrying a set of magnets 631; a circuit board 5 longitudinally mounted in the downward tube 61, the circuit board 5 comprising a plurality of solenoids 51 arranged at different elevations for acting with the magnets 631 to indicate current elevation of the float 63 in the oil tank of the vehicle; a screw cap 7 fastened to the bottom end of the downward tube 61 to close the passage, a seal ring 71 mounted between the screw cap 7 and the downward tube 61 to seal the gap, a clamp 72 fastened to the downward tube 61 near the bottom side to limit down stroke of the float 63, a cover 8 covered on the mount 6. The solenoids 51 each have two opposite ends 511 and 512 respectively inserted through a respective through hole at the circuit board 5, and then welded to a respective terminal at the circuit board 5. The two terminals of the circuit board 5 are respectively extended out of the mount 5 through wire grooves 611 at the mount, and connected to a control circuit outside the oil tank. This oil level detector mounting arrangement is functional. However, because the two opposite ends of each of the solenoids 51 are fixedly fastened to the circuit board 5, the solenoids 51 tend to be damaged by shock waves during transpiration of the oil level detector.

SUMMARY OF THE INVENTION

The present invention has been accomplished to provide an oil level detector mounting arrangement, which eliminates the aforesaid problem. According to the present invention, the solenoids each have a first end inserted through a respective hole at the circuit board and then welded to a contact at the circuit board, and a second end inserted through a respective hole at the circuit board and then welded to a common springy wire conductor suspended from the circuit board. Because the solenoids each have one end fixedly connected to the circuit board and an opposite end suspended from the springy wire conductor, shock waves can be absorbed by the springy wire conductor during transportation of the oil level detector.

DETAILED DESCRIPTION OF THE PREFERRED EMBODIMENT

Figure 1:
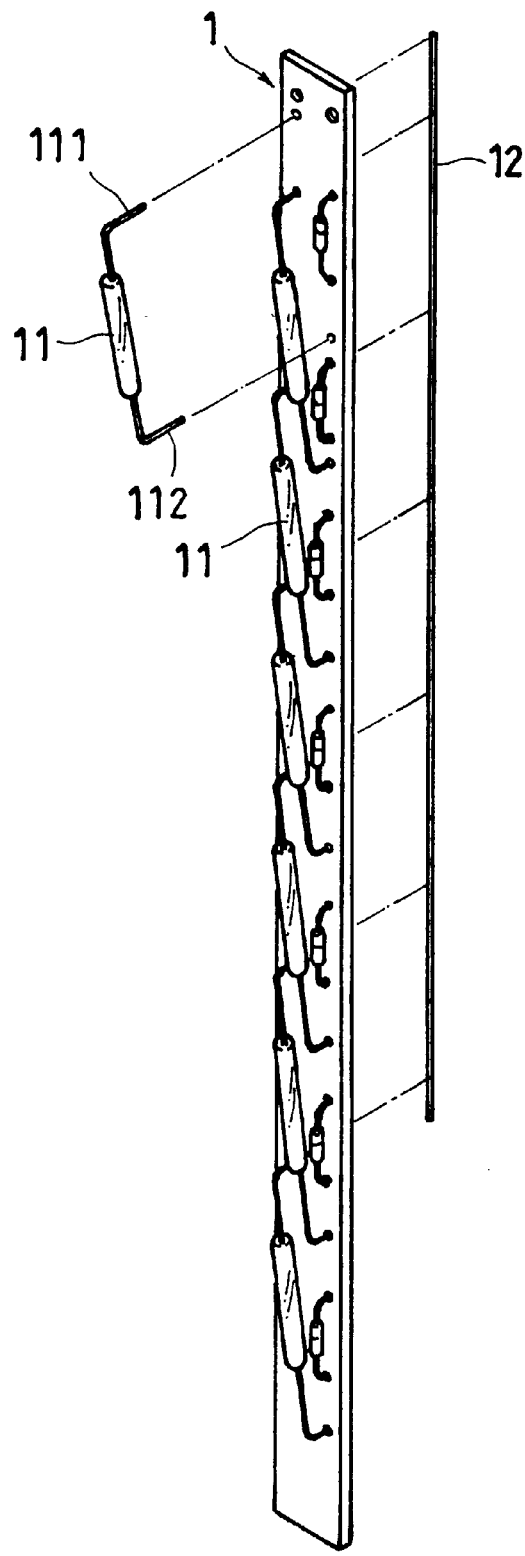
FIG. 1 is an exploded view of a circuit board for an oil level detector mounting arrangement according to the present invention.
Figure 2:
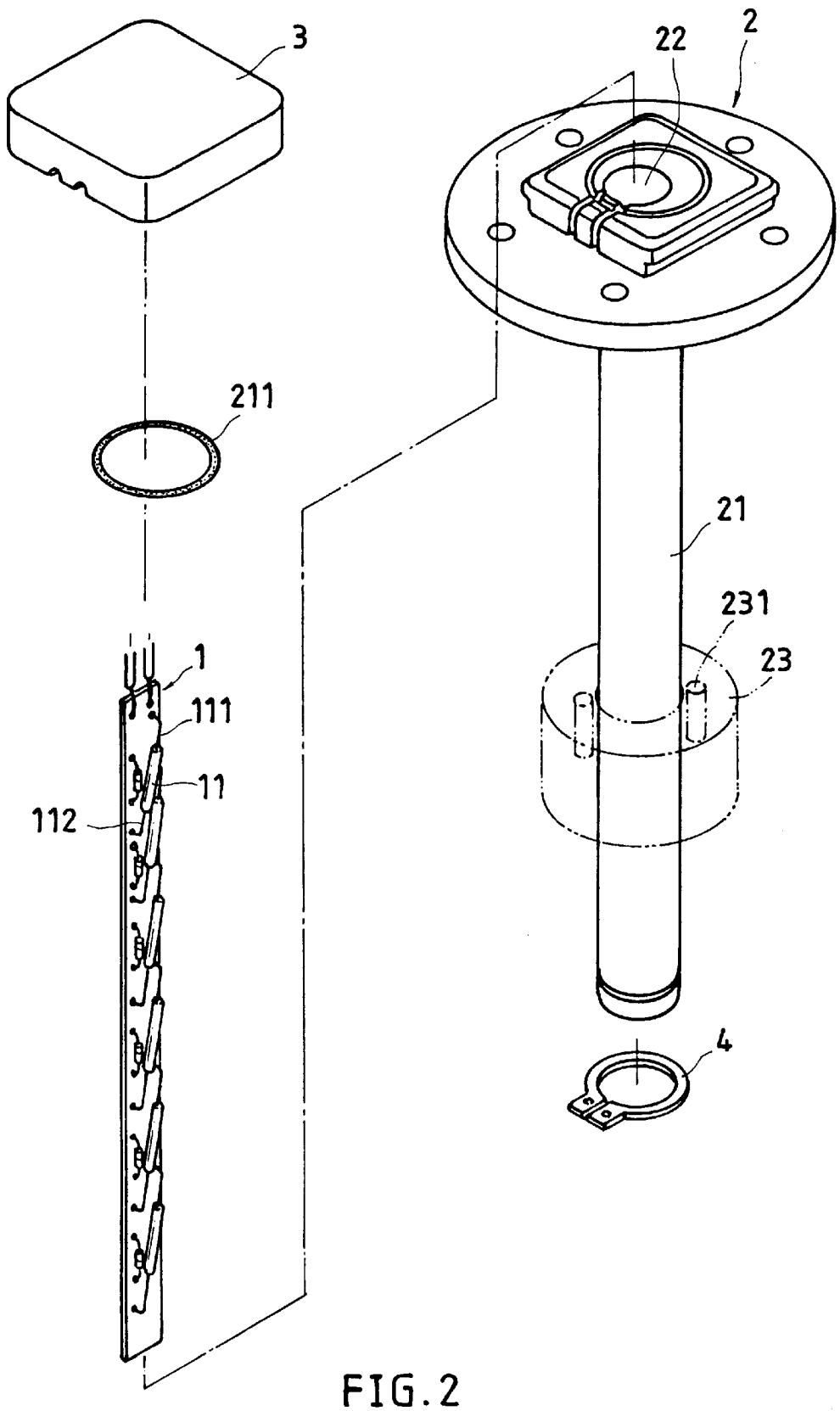
FIG. 2 is an exploded view of an oil level detector mounting arrangement according to the present invention.
Figure 3:
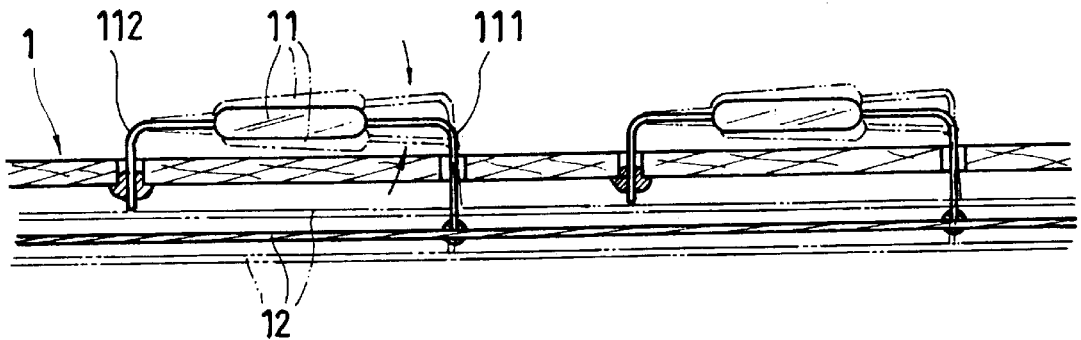
FIG. 3 is a sectional view in an enlarged scale of a part of the circuit board, showing the solenoids vibrated.
Figure 5:
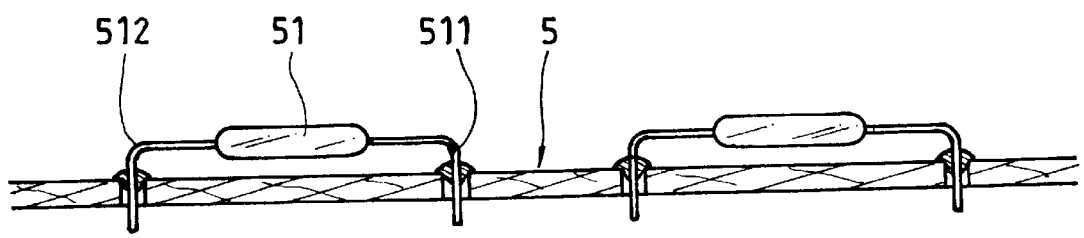
FIG. 5 is a sectional view in an enlarged scale of a part of the circuit board shown in FIG. 4.
Figure 4:
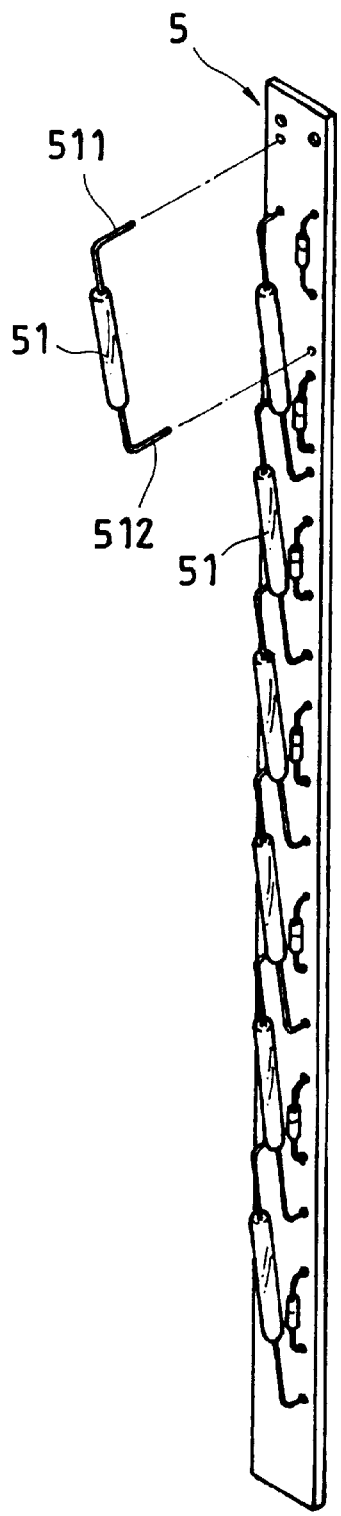
FIG. 4 is an exploded view of a circuit board for an oil level detector mounting arrangement according to the prior art.
Figure 6:
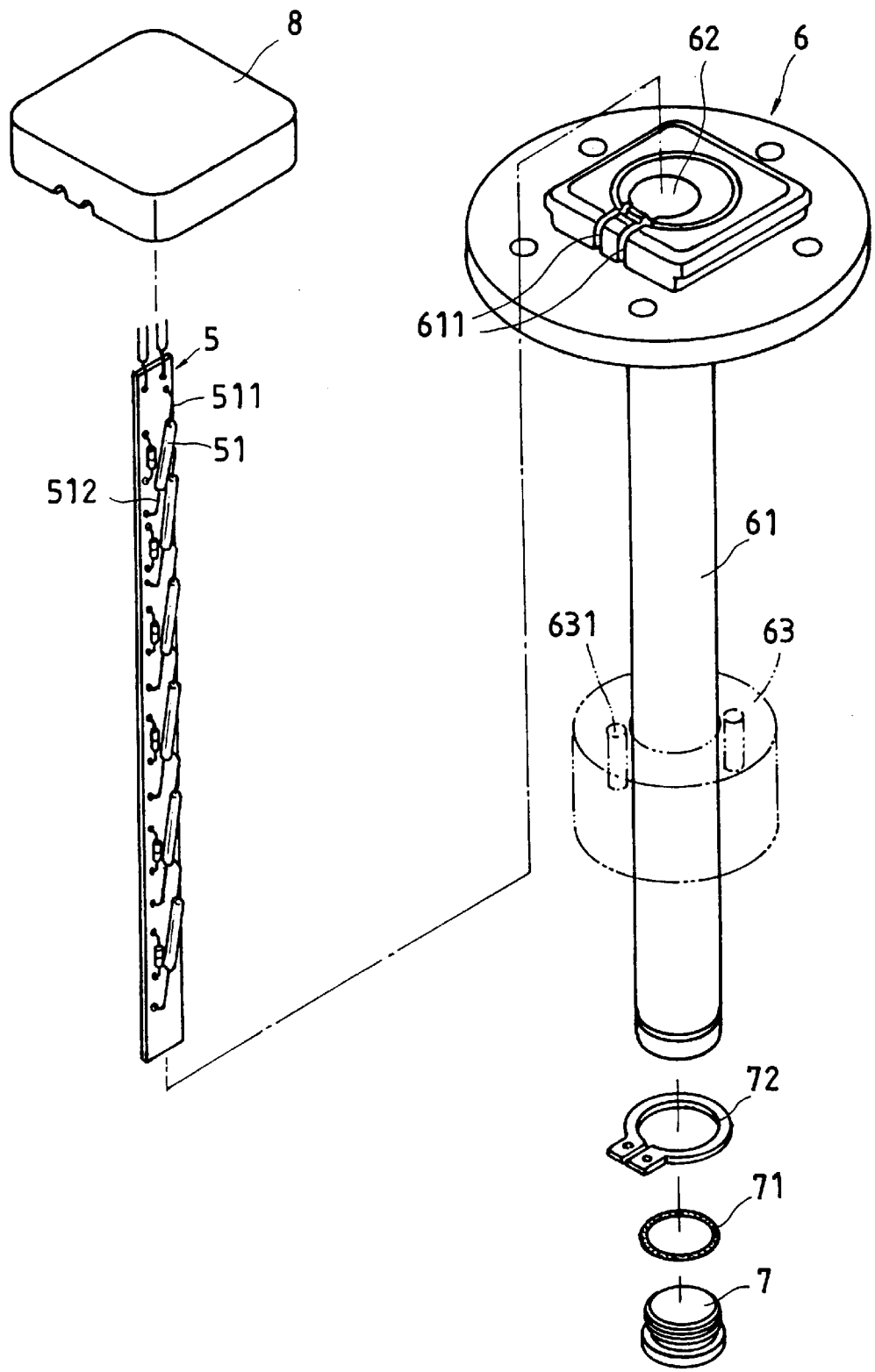
FIG. 6 is an exploded view of the oil level detector mounting arrangement according to the prior art.

Referring to FIGS. 1, 2 and 3, an oil level detector mounting arrangement in accordance with the present invention is shown comprised of a circuit board 1, a mount 2, a float 23, and top cover 3, and a clamp 4.

The mount 2 is fixedly fastened to the inside of the oil tank of a vehicle, having a center hole 22 and a downward tube 21 extended from the bottom side wall thereof around the center hole 22. The bottom end of the downward tube 21 is a closed end. The circuit board 1 is inserted into the center hole 22 and fixedly fastened to the inside of the downward tube 21, comprising a plurality of solenoids 11 arranged at different elevations, and a springy wire conductor 12. The solenoids 11 each have a first end 112 inserted through a respective hole at the circuit board 1 and then fixedly welded to the circuit board 1, and a second end 111 inserted through a respective hole at the circuit board 1 and then welded to the springy wire conductor 12. The cover 3 is covered on the mount 2 to close the center hole 22. A seal ring 211 is mounted between the cover 3 and the mount 2 to seal the gap. The float 23 is moved with the oil level in the oil tank along the downward tube 21, having a plurality of magnets 231, which act with the solenoids 11. The clamp 4 is fastened to the downward tube 21 to limit down stroke of the float 23. The float 23 moves along the downward tube 21 subject to the level of the oil in the oil tank, and the corresponding solenoid 11 is induced to output a signal to the control circuit (not shown) outside the oil tank, indicating the current elevation of the float 23 (corresponding to the level of oil in the oil tank).

Because the solenoids 11 each have a second end 111 suspended from the springy wire conductor 12, less vibration is transmitted to the solenoids 11 during transportation of the oil level detector, and a severe temperature change which causes the solenoids 11 to expand or to shrink does not damage the solenoids 11.

While only one embodiment of the present invention has been shown and described, it will be understood that various modifications and changes could be made thereunto without departing from the spirit and scope of the invention disclosed. For example, a corrosion protective covering may be provided and sleeved onto the circuit board for protection. Of course, the installation of the corrosion protective covering must not affect the operation between the magnets 231 at the float 23 and the solenoids 11 at the circuit board 1.

What the invention claimed is:

1. An oil level detector mounting arrangement comprising:

a mount fixedly fastened to the inside of the oil tank of a vehicle, said mount comprising a center hole, and a downward tube having an open top end formed integral with said mount around said center hole and a closed bottom end dipped into the oil in the oil tank of the vehicle;

a float floating in the oil in the oil tank of the vehicle and moved vertically along said downward tube, said float carrying a set of magnets; and a circuit board longitudinally mounted in said downward tube, said circuit board comprising a plurality of solenoids arranged at different elevations for acting with said magnets to indicate current elevation of said float in the oil tank of the vehicle;

wherein said solenoids each have a first end inserted through a respective hole at said circuit board and then welded to a contact at said circuit board, and a second end inserted through a respective hole at said circuit board and then welded to a common springy wire conductor suspended from said circuit board.

2. The oil level detector mounting arrangement of claim 1 wherein said circuit board is sleeved with a corrosion protective covering, and extended with said corrosion protective covering out of the center hole of said mount, and a cover is covered on said mount over said corrosion protective covering and said circuit board with a seal ring mounted between said cover and said mount to seal the gap.

* * * * *